United States Patent
Maezawa (10) Patent No.: US 7,240,227 B2
(45) Date of Patent: Jul. 3, 2007

(54) AUTOMATIC RESTART AND RESUME OF COMPUTING SYSTEM UPON REAPPLICATION OF EXTERNAL POWER

(75) Inventor: Yasunori Maezawa, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 10/919,113

(22) Filed: Aug. 15, 2004

(65) Prior Publication Data

US 2006/0036880 A1    Feb. 16, 2006

(51) Int. Cl.
 *G06F 1/28*     (2006.01)
 *G06F 15/177*   (2006.01)

(52) U.S. Cl. .......................... 713/300; 713/1
(58) Field of Classification Search ................ 713/300, 713/1
See application file for complete search history.

(56) References Cited

U.S. PATENT DOCUMENTS 5,317,752 A * 5/1994 Jewett et al. ................. 714/14
5,804,894 A * 9/1998 Leeson et al. .............. 307/130
6,464,317 B2 * 10/2002 Miyazawa ................... 347/14

FOREIGN PATENT DOCUMENTS

| JP | 08-202536   | 8/1996  |
|----|-------------|---------|
| JP | 09-274525   | 10/1997 |
| JP | 2000-175376 | 6/2000  |
| JP | 2000-197282 | 7/2000  |

OTHER PUBLICATIONS

Mark Baker et al., Grids and grid technologies for wide-area distributed computing, Software—Practice and Experience (2002).
Advanced Configuration and Power Interface (ACPI) Specification, sections 1-3, Revision 2.0c, Aug. 25, 2003.

* cited by examiner

*Primary Examiner*—Rehana Perveen
*Assistant Examiner*—Eric Chang
(74) *Attorney, Agent, or Firm*—Mark McBurney

(57) ABSTRACT

The automatic restart and resume of computing systems upon reapplication of external power, especially in the context of grid computing, is disclosed. A method receives a signal, such as an ACPI S4 signal, indicating that a power source of a computing system has discharged below a predetermined threshold level. The method sets a flag corresponding to signal receipt. The system enters hibernation or another state. Upon learning that external power has been reapplied, the method determines that the flag is set, and resets it. The system is caused to enter an unattended operation mode in which, for instance, grid-computing tasks may be resumed.

20 Claims, 5 Drawing Sheets

AUTOMATIC RESTART AND RESUME OF COMPUTING SYSTEM UPON REAPPLICATION OF EXTERNAL POWER

FIELD OF THE INVENTION

The present invention relates to restarting and resuming computing systems upon reapplication of external power thereto after external power has been removed therefrom.

BACKGROUND OF THE INVENTION

Traditional servers are usually relegated to centralized locations, such as server rooms having tens, hundreds, or thousands of computers maintained by grid computing providers. Such centralized resources enable their maintenance to be easily accomplished. For instance, network and other administrators are able to ensure that these resources are located in an environmentally suitable environment, with respect to temperature, humidity, and so on. Furthermore, power back-up facilities can easily be provided to centralized resources, in case the primary electrical power to the resources is temporarily disrupted. Should problems develop, technicians are usually located on-site, or a short distance away, to fix the problems in a timely manner. Even if a lengthy power outage occurs, technicians can usually maintain the servers for long periods of time, due to back-up power facilities.

However, the popularity of the Internet, as well as the availability of powerful computers and high-speed network technologies as low-cost commodity components is changing the way computers are used. These technology opportunities have led to the possibility of using distributed computers as a single, unified computing resource, leading to what is commonly referred to as grid computing. The term grid has been chosen as an analogy to a power grid that provides consistent, pervasive, dependable, and transparent access to electricity irrespective of its source.

A computational grid enables the sharing, selection, and aggregation of a wide variety of computational resources, including supercomputers, storage systems, data sources, and specialized devices that are geographically distributed and potentially owned by different organizations, for solving large-scale computation and data-intensive problems in science, engineering, and commerce, among other problem domains. A computational grid may be viewed as a seamless, integrated computational and collaborative environment. Users and client devices interact with the grid resource broker to solve problems, which in turn performs resource discovery, scheduling, and the processing of application jobs on the distributed grid resources. From the end-user point of view, computational grids can be used to provide services such as computational services, data services, and application services.

Organizations have looked to leveraging all of their resources to deploy within computational grids. For example, large corporations typically have thousands of computers deployed worldwide for their employees. These computers can include desktop computers as well as laptop, or notebook, computers. Except when running the most intensive computational applications, which is infrequent, most of these computers sit mostly idle during the workday. Common tasks such as word processing, Internet access, and email require only a small amount of the computational power that the computers are capable of providing. Furthermore, when employees go home for the day or for the week, their computers usually sit completely idle, their computational power wasted.

Organizations have thus attempted to harness these distributed resources into computational grids, to leverage all of their computing assets for computationally intensive tasks. However, including desktop and laptop computers primarily intended for end-user usage into computational grids can be problematic. Unlike computing resources located in a centralized location, end-user computing devices are more likely not to be located in an environmentally controlled environment. Should a computer be accidentally turned off, or if a computer loses its external power connection, its connection to the computational grid may be severed. While such complications can be easily handled within a data center having thousands of server computers and on-site technicians dedicated to ensure their uptime, when these problems occur for end-user computers a technician may not be able to be immediately dispatched to solve them.

As a result, harnessing desktop and laptop computers primarily intended for end-user usage into computational grids may result in decreased reliability of the computational grids. For example, if external power that enables these computers to run is lost for an extended period of time, the computational grid encompassing the computers loses their computational power. Furthermore, even when external power is re-supplied to the computers, there is no facility for restarting them and for the computers to resume their grid computing tasks. For organizations that have thousands of computers, this may require technicians to be dispatched to individually turn each computer back on and ensure that it has resumed its grid computing tasks. However, such a solution is time-consuming and costly.

That is, within grid computing, even a client computing device, like a laptop, notebook, or desktop computer, can become a component of the computational grid. However, the grid is presumed to be available at any time, which means that the client computing devices need to be available at any time to run or continue a computational grid task sent by a broker of the grid, even if a power outage occurs. Notebook or laptop computers, due to their inclusion of internal power sources like batteries, and desktop computers to which uninterruptible power supplies (UPS's) are attached, are thus able to function within a grid, since their batteries provide back-up power should a power outage occur. However, if the batteries become exhausted during a long power outage, these computers will not be able to continue a grid task.

SUMMARY OF THE INVENTION

The invention relates to the automatic restart and resume of computing systems upon reapplication of external power, after external power has been removed from a computing system, especially in the context of grid computing. That is, a computer, such as a notebook or laptop computer with a battery or a desktop computer with an uninterruptible power supply (UPS), can resume from a long power outage safely, to assure the availability of grid computing. When a power outage occurs, a grid task can continue to run even after the external power has been removed. However, in the case of a long power outage, the battery will be discharged to a critically low level, where the grid task cannot continue, and the operating system causes the computer to enter into a state of hibernation, through the computer's basic input/output system (BIOS).

A method of an embodiment of the invention thus receives a critical context-saving sleep state-inducing signal that indicates that internal power, such as a battery, has been discharged to a critically low level. This signal may be a critical Advanced Configuration and Power Interface (ACPI) S4 signal. The method sets a flag within non-volatile memory of the computing system, where the flag corresponds to receipt of the critical signal. For instance, a kernel driver may be informed by the operating system of the computing system, and the kernel driver informs the BIOS via an interrupt, such as a system management interrupt (SMI). The BIOS then informs an embedded processor, which sets the flag within the non-volatile memory. The computing system enters a hibernation or other no-power usage state, such as by the operating system requesting the BIOS to enter into a G3 state, after having saved the current context of the computing system to storage, such as a hard disk drive.

Upon receiving indication that external power has been reapplied to the computing system, the method determines that the flag within the non-volatile memory has been previously set. If so, the flag is reset within the non-volatile memory, and, once the computing system has ensured that its battery or other internal power source has been sufficiently charge, the computing system is caused to enter an unattended operation mode in which, for instance, grid-computing tasks may be restarted or resumed. In the unattended operation mode, the BIOS may unlock a power-on password (POP) and a hard disk password (HDP), and resume grid-computing tasks. In this mode, the display may be maintained in a substantially blank state to ensure security. Once the user of the computing system has arrived, he or she is then requested to properly enter the POP to start attended operation activities.

It is noted that the user is able to set an option that allows the computing system to become a computational grid component or resource during idle times of the computing system, such that any grid tasks being executed on the computing system automatically resume when external power is reapplied after a power outage. Without this option being set, in one embodiment of the invention the computing system resumes when external power is again reapplied to the system. The hard disk drive of the computing system is involved heavily during the resumption process, because the saved memory context is restored to memory from the hard disk drive. Any shock assert during this heavy usage of the hard disk drive could potentially cause fatal damage. Because users of portable computers, like notebook and laptop computers, tend to move their computers around to locate wall outlets in which they can plug their computers in, the users thus could cause fatal damage if the computing system automatically resumes when external power is reapplied. Therefore, if the user is not using the computer for grid computing tasks, he or she can disable this option to avoid potential damage.

Embodiments of the invention provide for advantages over the prior art. A critical ACPI S4 signal, or other critical context-saving sleep state-inducing signal, is received, such as in response to a laptop or notebook computer losing external power, or in response to a desktop computer receiving notice from an uninterruptible power supply (UPS). Embodiments of the invention set a flag indicating that the signal has been received where a corresponding option has been selected in the BIOS. The computer enters hibernation or another no-power usage state, such as an ACPI G3 state. Once external power has been reapplied, the computer can then detect that receipt of the critical signal caused it to enter hibernation, by checking the flag saved to non-volatile memory. When the computer has been brought back into a usable state (i.e., after the internal power source such as a battery has been sufficiently charged), it can continue an unattended operation mode in which grid computing and other tasks may be continued.

Thus, embodiments of the invention allow end-user and client-oriented computers to be more easily employed within a computational grid. Should external power loss occur, the computers indicate why they have entered hibernation, or have shutdown or entered another no-power usage state, by setting the non-volatile memory flag. When external power is re-supplied, the computers then can determine that the previous power less was undesirable, and restart and resume grid computing tasks. All of this can be accomplished without any user involvement. Thus, computers can be brought back online as functional components of a computational grid in an easy and efficient manner, without requiring technicians or administrators to go computer to computer to turn back on each computer and ensure that the computers are again part of the grid. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
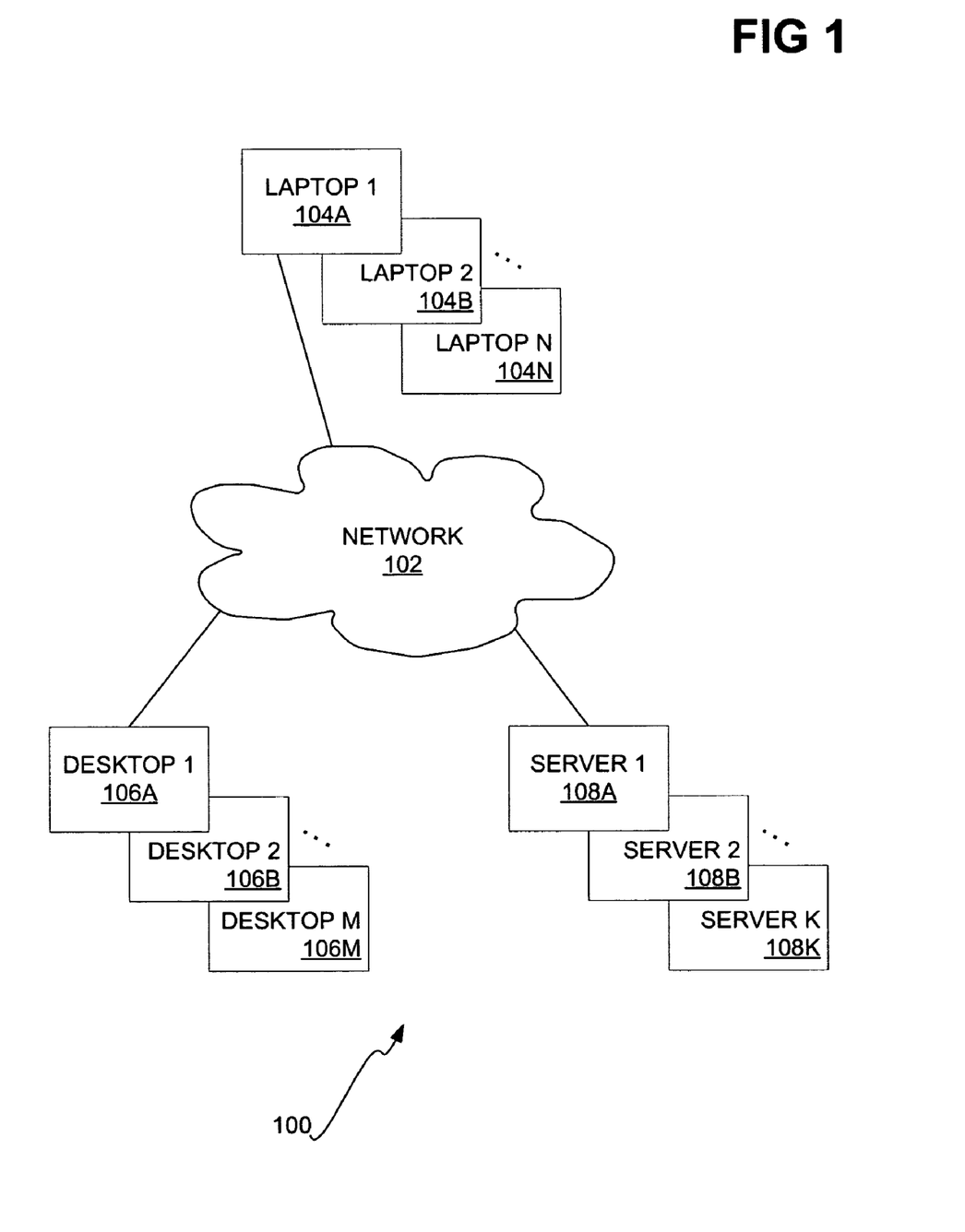
FIG. 1 is a diagram of a distributed grid computing system environment, in conjunction with which embodiments of the invention may be implemented.

FIG. 1 shows a representative grid-computing environment, in conjunction with which embodiments of the invention may be implemented. A computational grid 100 is made up a of a network 102, laptop computers 104A, 104B, ..., 104N, collectively referred to as the laptop computers 104, desktop computers 106A, 106B, ..., 106M, collectively referred to as the desktop computers 106, and server computers 108A, 108B, ..., 108K, collectively referred to as the server computers 108. As can be appreciated by those of ordinary skill within the art, the computational grid 100 may be made up of other devices in addition to and/or in lieu of those depicted in FIG. 1. The network 102 may be or include one or more of: the Internet, intranets, extranets, wide-area networks (WAN's), local-area networks (LAN's), wired networks, wireless networks, cellular networks, telephony networks, as well as other types of networks.

The laptop computers 104 and the desktop computers 106 can be computers that are intended for end-user use. However, in the context of the computational grid 100, they are resources that contribute to the processing capabilities of the computational grid 100. The laptop computers 104 can also include notebook computers and other types of portable computers and computing devices that include internal power supplies, such as batteries and fuel cells. The laptop computers 104 thus can operate for at least a short period of time when disconnected from external power, such as alternating current (AC) power commonly received through wall outlets. The desktop computers 106 can in one embodiment of the invention have internal or, more commonly, external uninterruptible power supplies (UPS's). UPS's allow the desktop computers 106 to operate for a short length of time when external power is removed from the computers 106, so that the computers 106 can be entered into a sleep state such as a critical S4 state, as is described in more detail later in the detailed description. It is noted that the UPS's interface with the desktop computers 106, such as via a serial cable, a Universal Serial Bus (USB) cable, or another type of interface, to be notified of events like critical S4 events, so that the events can be stored in non-volatile memory of the UPS's.

The server computers 108 are generally computers that are not intended for direct end-user use. For instance, the server computers 108 may be computers that are housed within centralized locations, with a large number of such server computers at any given location. Nevertheless, embodiments of the invention are applicable to implementation in conjunction with such server computers 108. However, embodiments of the invention are more intended to be applied to the laptop computers 104, and to the desktop computers 106 where they have UPS's or other mechanisms for being to operate for a short length of time when external power is removed therefrom.

Figure 2:
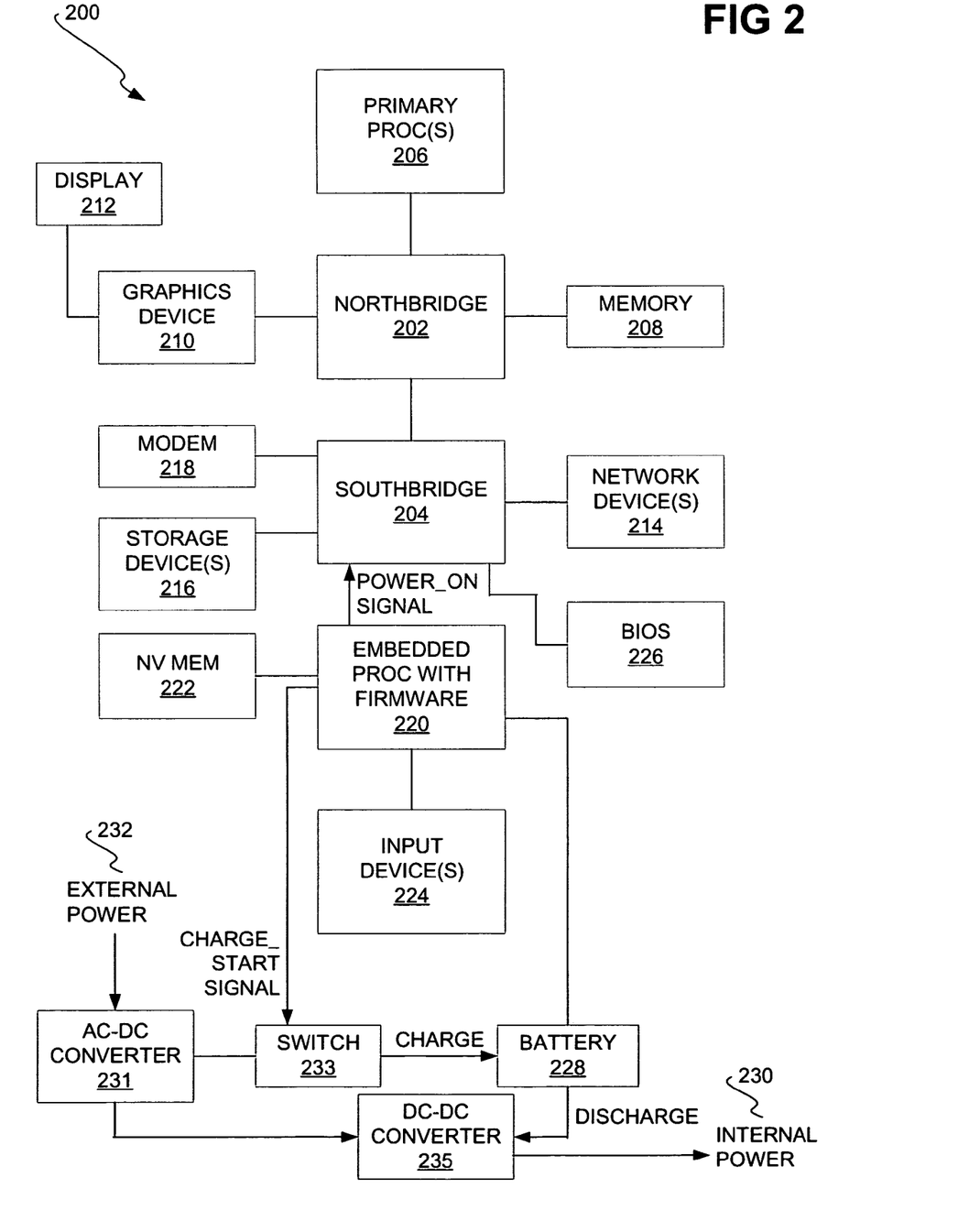
FIG. 2 is a diagram of example end-user, client-oriented computing device that may be employed as a grid computing resource within the computational grid of FIG. 1, according to an embodiment of the invention.

FIG. 2 shows an example end user-intended computing device 200, according to an embodiment of the invention. As depicted specifically in FIG. 2, the computing device 200 is a portable computing device, such as a laptop or a notebook computer, having a battery 228 or other internal power source. Alternatively, however, the computing device 200 may be a desktop computer, or other computing device that does not have an internal power source like the battery 228. In such instance, the computing device 200 may be connected to external power 232, such as AC power received through a wall outlet, via a UPS.

The computing device 200 has a chipset architecture made up of a Northbridge controller 202 and a Southbridge controller 204. The chipset of the computing device 200—i.e., the controllers 202 and 204—provide interfacing functionality of all the sub-systems of the computing device 200. Thus, the Northbridge controller 202 is responsible for interacting with one or more primary processors 206, memory 208, and a graphics device 210 connected to a display 212. The processors 206 are the main processing units of the computing device 200, and are the processors that perform user-requested tasks, such as word processing, Internet web browsing, and so on, as well as grid-computing tasks. Where there is one of the processors 206, it is referred to as the central processing unit (CPU). The processors 206 in the context of desktop, laptop, and notebook computers are commonly, but not necessarily, x86 processors, which are processors capable of executing x86 instructions, as known within the art.

The memory 208 is typically random-access memory (RAM), and is the primary memory of the computing device 200. RAM loses its contents when power is removed from the memory 208. The graphics device 210 may be part of the chipset architecture of the computing device 200, or may be an external graphics adapter inserted into a slot of the computing device 200. The display 212 may be a cathode-ray tube (CRT), liquid crystal display (LCD), plasma display, or another type of display.

The Southbridge controller 204 interfaces a variety of other sub-systems of the computing device 200, such as one or more network devices 214, a modem 218, and one or more storage devices 216. The network devices 214 may be part of the chipset architecture of the computing device 200, or may be external network adapters inserted into slots of the computing device 200. The network devices 214 permit wired or wireless connection with other computing devices. The storage devices 216 are typically hard disk drives, but may be other types of storage devices.

The Southbridge controller 204 also interfaces with an embedded processor 220 that is directly connected to non-volatile memory 222. The embedded processor 220 is not a primary processor of the computing device 200, and instead may be considered as a service processor of the computing device 200 intended to perform specific shutdown, startup, and resume tasks, as described in more detail later in the detailed description. The embedded processor 220 stores various information that is needed across reboots of the computing device 200 in the non-volatile memory 222, as is also described in more detail later in the detailed description. Non-volatile memory is that which retains its contents even after power is removed therefrom.

The embedded processor 220 further interfaces with one or more input devices 224, such as keyboards, pointing devices like computer mice, touchpads, and so on, as well as a basic input/output system (BIOS) 226 of the computing device 200, the BIOS being interfaced through the Southbridge controller 204. The BIOS 226 is a small set of computer-executable routines, typically stored on a single chip, and provides an interface between an operating system (OS) of the computing device 200 and its constituent hardware. The BIOS 226 supports peripheral technologies and internal services such as the realtime clock. On startup of the computing device 200, the BIOS 226 may test the device 200 and prepares it for operation. It loads the OS and passes control over to the OS. The BIOS 226 of one embodiment of the invention is modified, as described in more detail later in the detailed description. The embedded processor 220 includes firmware, which is software that enables it to perform the functionality described herein.

The embedded processor 220 further interfaces with an internal battery 228, or other internal power source, to determine how much charge is left in the battery 228, and whether it is charging from the external power 232 or discharging when disconnected therefrom. The BIOS 226 itself is able to determine in one embodiment of the invention whether the computing device 200 is connected to or disconnected from the external power 232, such as AC power supplied through a wall outlet, and so on. The battery 228 provides power to all of the components of the computing device 200, as indicated by the reference number 230. Where the computing device 200 is alternatively a desktop computer, there may be no internal battery 228, but rather a backup UPS to allow the computing device 200 to operate for at least a brief length of time when the external power 232 is removed. The external power 232 is preferably alternating current (AC) power, which is converted to direct current (DC) power via an AC-DC converter 231, and communicatively coupled to the battery 228 via a switch 233, as can be appreciated by those of ordinary skill within the art. The DC-DC converter 235 converts the DC power provided by the AC-DC converter 231 into the DC power that can power the components of the computing device, as indicated by the reference number 230.

It is thus noted that there are two power circuit groups within FIG. 2. The first group includes the embedded processor 220, the non-volatile memory 222, the battery 228, the input devices 224 (where they include a power switch), the AC-DC converter 231, the switch 233 that allows the battery 228 to be charged, and the DC-DC converter 235. The other power circuit group includes the other components of FIG. 2. When external power is applied, the first group is activated, but the second group is not initially activated. The embedded processor 220 checks the remaining battery capacity, and will assert or de-assert the CHARGE_START signal to start charging the battery, as described in relation to FIG. 4. The embedded processor 220 also checks the remaining battery capacity and will assert the POWER_ON signal to start a main system circuit, resulting in the BIOS 226 starting, and the operating system booting to resume any grid tasks.

Figure 3A:
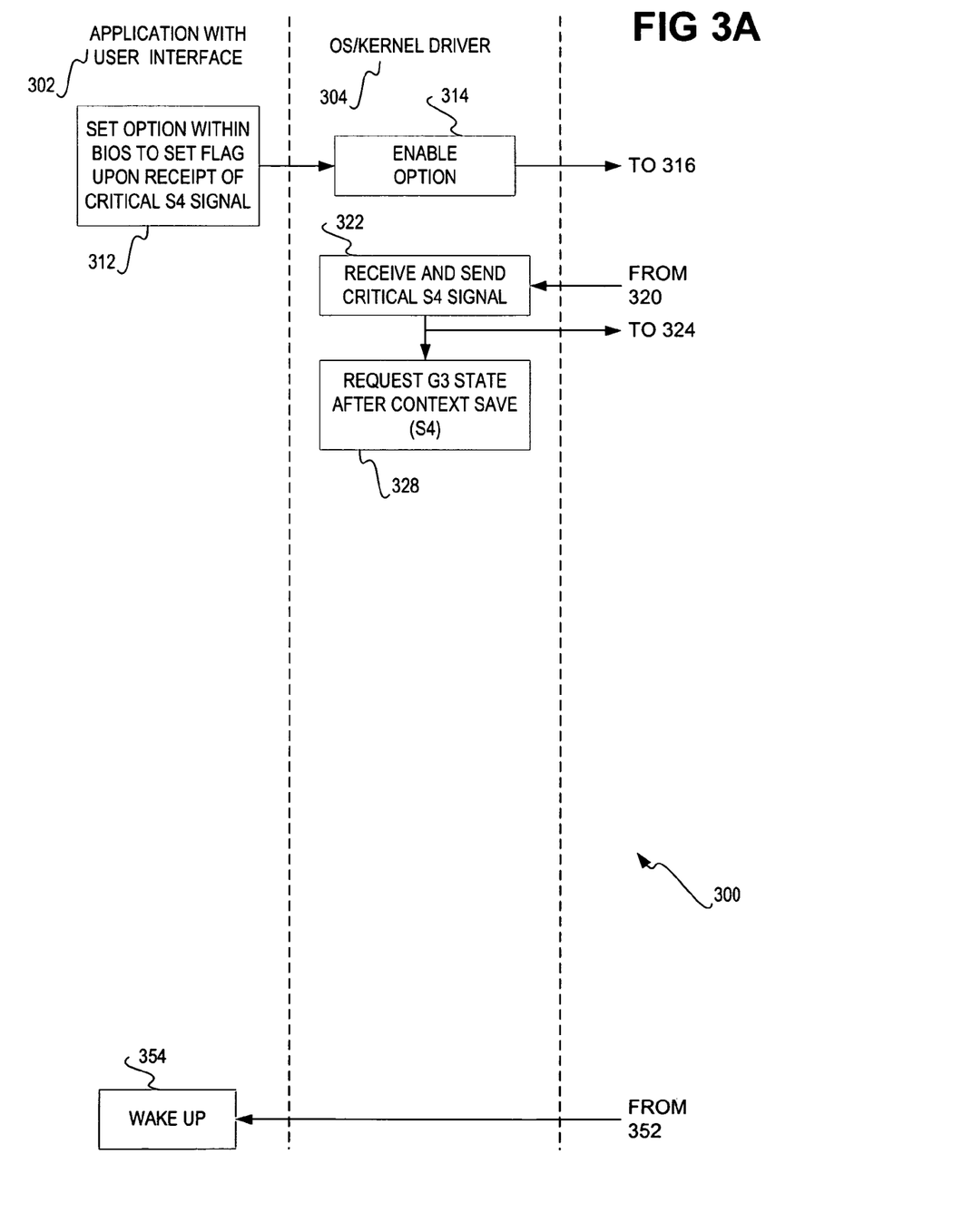
FIGS. 3A and 3B are flowcharts of a method for automatically restarting and resuming the computing device of FIG. 2 upon reapplication of external power, after external power has been undesirably and/or unintentionally removed, according to an embodiment of the invention.
Figure 3B:
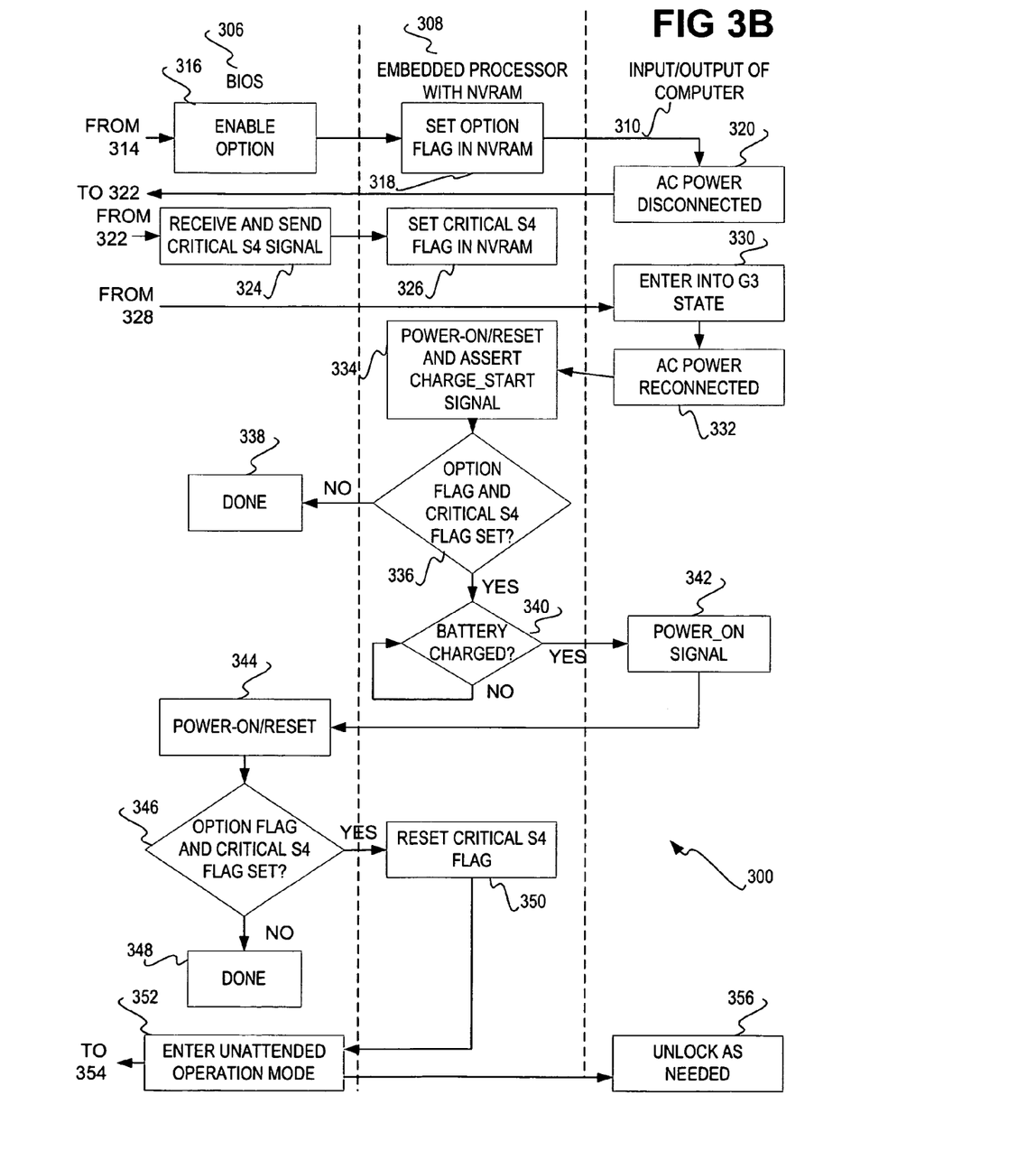

FIGS. 3A and 3B shows a method 300 for automatically restarting and resuming the computing device 200 upon reapplication of external power, after external power has been undesirably and/or unintentionally removed, according to an embodiment of the invention. At least some parts of the method 300 may be implemented on a computer-readable medium of an article of manufacture. The medium may be a recordable data storage medium, a modulated carrier signal, or another type of computer-readable medium.

The method 300 is divided into five columns in FIGS. 3A and 3B, indicating which steps or acts of the method 300 are performed by which components of the computing device 200. Parts of the method 300 in the first column from the left are performed by an application program running on the OS of the computing device 200. The application program has a user interface, such as a graphical user interface. Parts of the method 300 in the second column from the left are performed an OS and/or kernel driver. The kernel is the fundamental part of the OS, and resides in memory at all times to provide basic services. It is the part of the OS that is closest to the hardware of the computing device 200 and may activate the hardware directly or interface to another software layer that drives the hardware.

Parts of the method 300 in the center column of FIGS. 3A and 3B are performed by the BIOS 306, which can be the same as the BIOS 226 of FIG. 2 in one embodiment of the invention. Parts of the method 300 in the second column from the right are performed by the embedded processor with non-volatile memory, such as non-volatile RAM (NVRAM), 308, which can be the same as the embedded processor 220 with the non-volatile memory 22 of FIG. 2 in one embodiment of the invention. Finally, parts of the method 300 in the first column from the right are performed by various input/output (I/O) of the computing device 200, such as various hardware of the computing device 200, as can be appreciated by those of ordinary skill within the art.

The method 300 starts with a user setting an option within the BIOS to have a critical S4 flag set upon receipt of a critical S4 signal within the application 302 (312). This setting is conveyed from the OS/kernel driver 304 (314), to the BIOS 306 (316) via a system management interrupt (SMI), and to the embedded processor 308, which sets a corresponding option flag in the NVRAM (318). Thereafter, in one embodiment it is presumed that grid computing-related tasks are being performed by the computing device 200.

The I/O 310 then detects or otherwise receives indication that AC power—i.e., external power—has been removed or disconnected from the computing device 200 (320). The computing device 200 is an Advanced Configuration and Power Configuration Interface (ACPI)-compliant device in one embodiment of the invention, where information regarding the ACPI may be located on the Internet at the Universal Resource Locator (URL) address http://www.acpi.info. Removal or disconnection of AC power results in a critical S4 signal. The critical S4 signal is one type of critical context-saving sleep state-inducing signal indicating that external power has been removed from the computing device 200. The critical context-saving sleep state-inducing signal may also be a critical context-saving hibernation-inducing signal, where hibernation is one type of sleep state, as known within the art.

The critical S4 signal differs from other types of S4 signals in that the critical S4 signal is generated as a result of the back-up power source of the computing device, like an internal battery or external UPS, having reached a low state of charge, such that hibernation is necessary. That is, external power has been removed from the computing device, and the back-up power source, like an internal battery or external UPS, has discharged to a critically low, predetermined threshold level. By comparison, other, non-critical types of S4 signals result from user initiation. An S4 signal corresponds to a signal to have the computing device 200 enter into an S4 sleep state. The S4 sleep state is the lowest power, longest wake latency sleep state supported by ACPI. In order to reduce power usage to a minimum, it is thus assumed that the computing device 200 has powered off all devices, but retains the context of the computing device 200. The context of the computing device 200 includes the current contents of volatile memory, which programs running are running on the device 200, and so on.

The OS/kernel driver 304 receives the critical S4 signal and sends it to the BIOS 306 (322). The BIOS 306 receives the critical S4 signal and sends it to the embedded processor 308 via an SMI (324). In response, the embedded processor 308 sets a critical S4 flag within the NVRAM, the critical S4 flag thus corresponding to receipt of a critical context-saving sleep state-inducing signal. Concurrently, the OS/kernel driver 304 saves the current context of the computing device 200 by, for instance, saving the current contents of volatile memory to hard disk drive or another type of storage, and then requests that the I/O of the computing device 200 enter in a no-power usage sleep state (328). The I/O of the computing device 200 in response enters in this sleep state (330). The sleep state entered into may in one embodiment of the invention be the global power state known as the G3 state. The global power G3 state is a mechanical off state, as compared to the G2 soft off state, the G1 sleeping state, or the G0 working state.

At some point in the future, AC power is re-supplied, or reconnected, to the I/O of the computing device 200 (332). This results in a power-on/reset (POR) of the embedded processor 308 (334), that is, indication that the external power has been reapplied to the computing device 200, such as via receipt of a POR signal. Upon receiving such indication, then, the embedded processor 308 asserts a CHARGE_START signal (334), and determines whether both the option flag and the critical S4 flag are set (336). If not, then the method 300 is finished (338). However, where both the option flag and the critical S4 flag are set, the embedded processor 308 first waits until the battery or other back-up power source of the computer has been sufficiently charged by the external power (340), before powering on the I/O of the computing device 200 (342). Performance of the step or act of 342 may be referred to in one embodiment of the invention as powering on and resetting the computing device 200. Where the computing device 200 is not a portable computing device like a laptop or notebook computer, no recharging is necessary, however, and the method 300 may proceed directly to 342 from 336, since any UPS connected to the computing device 200 is not likely to have the embedded processor 308 manage recharging.

In one embodiment, the internal power source of the computing device 200 is sufficiently charged by external power 340 in accordance with the following equation:

$$C_t = C_{ch} + \max(C_l) + C_{hw} + C_a. \tag{1}$$

$C_t$ is the residual capacity of the battery that triggers hibernation within the OS because the battery has very low charge left. $\max(C_l)$ is the maximum estimated battery capacity that is discharged during a power outage. $C_{hw}$ is the battery capacity that is needed for waking up from hibernation. Finally, $C_a$ is the drop in capacity resulting from an insufficiently activated battery.

Once the I/O of the computing device 200 has been powered on, the BIOS 306 is then powered-on via a POR signal (344), and also examines that the optional flag and the critical S4 flag are set in the NVRAM (346). If either or both of these flags are not set, then the method 300 is finished (348). However, where both of these flags are set, then the embedded processor 308 resets the critical S4 flag within the NVRAM (350), in preparation for the next power outage. The BIOS 306 causes the computing device 200 to enter an unattended operation mode (352), such that the OS/kernel drivers are waken up (354) and resume the computing device 200 from hibernation or other sleep state and resume operation from the point where it left off. To enter the unattended operation mode, the BIOS 306 unlocks and uses the power-on passwords (POP's) and hard drive password (HDP's) (356), so that the computing device can be used. Thereafter, distributed computer tasks, such as grid computing tasks, assigned to the computing device 200 and previously started by the device 200 prior to removal of the external power may be resumed.

In the unattended operation mode, only unattended tasks, such as distributed computer tasks like grid computing tasks, can be performed. The display of the device 200 is otherwise left blank. A user who talks up to the computing device 200 to attempt to use the device 200 will have to first enter in the POP's and HDP's him or herself before actually using the device 200 to perform user-initiated or attended tasks. That is, the computing device 200 is usable only for unattended tasks in the unattended operation mode, so that security is maintained until the rightful user enters in the proper passwords to use the device 200 for other purposes.

Thus, the method 300 achieves automatic resumption of grid computing-related tasks in the following manner. When a critical S4 signal is received, a corresponding flag is stored in NVRAM, and the computing device 200 enters into a hibernation or sleep state like the mechanical off G3 state after having saved the current context of the computing device 200. When external power is again reapplied, if this flag is set, then the computer automatically starts up again at the same context. Grid computing tasks that were being performed before the power outage thus automatically resume without user interaction. The setting of a flag corresponding to receipt of the critical S4 signal, or other critical context-saving sleep state—inducing signal, thus enables the computing device 200 and the method 300 to determine when power is resumed whether power loss was due to a critical S4 signal or other critical context-saving sleep state—inducing signal.

Embodiments of the invention differ from context resumption after prior art hibernation in at least two respects. First, hibernation in the prior art is caused due to user initiation, where the user initiates computing device entry into a hibernation or other context-saving sleep state. By comparison, embodiments of the invention have such a sleep state entered as resulting ultimately from the loss of external power, which causes a critical S4 signal, without user initiation—the user does not even have to be present. Second, resumption from hibernation in the prior art results also from user initiation, where the user presses a power-on button, for instance. By comparison, embodiments of the invention resume from such a sleep state automatically, soon after external power is reapplied or re-supplied to the computing device, again without user initiation.

Figure 4:
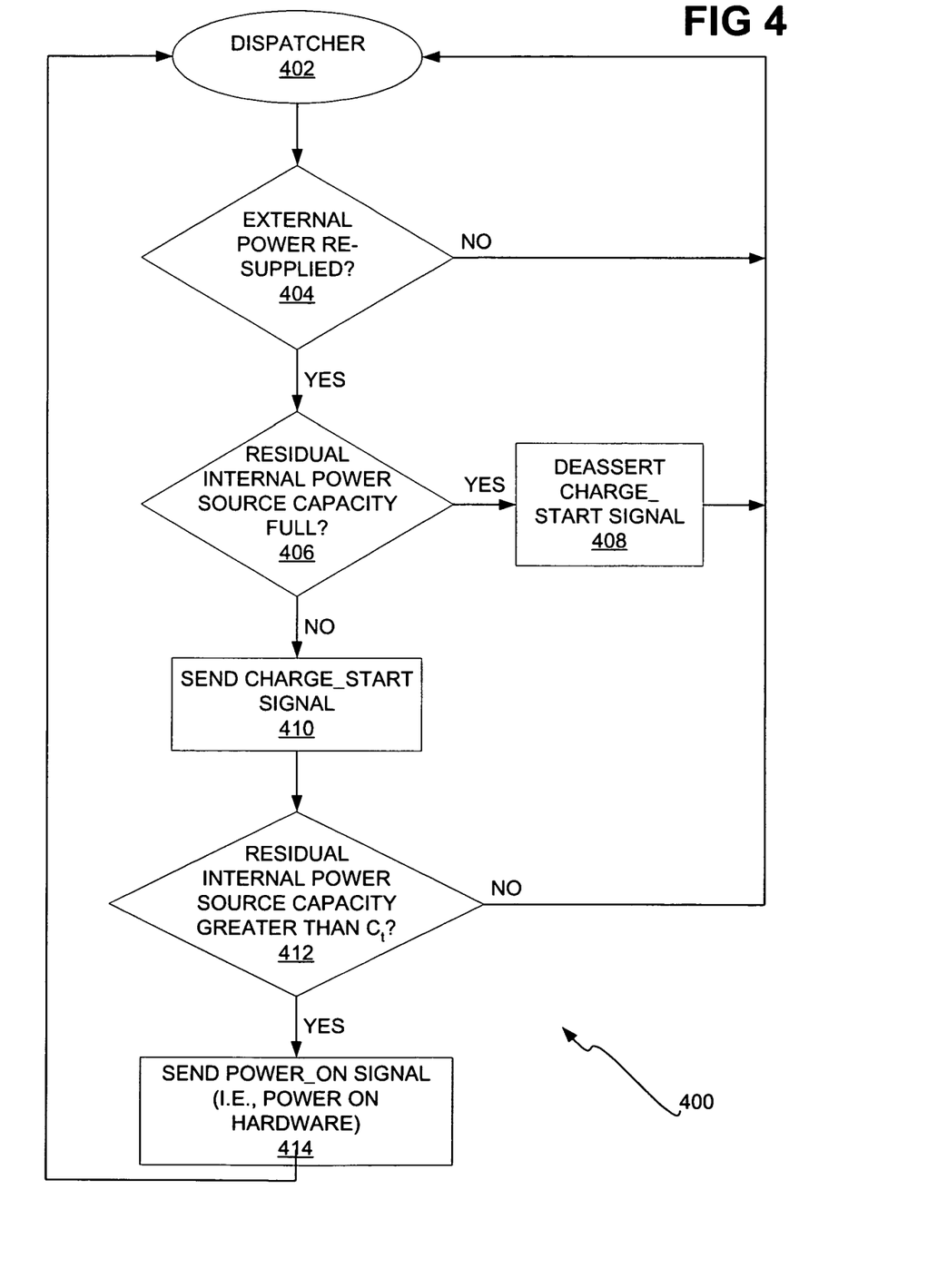
FIG. 4 is a flowchart of a method for internal power source management that may be performed by the embedded processor of the computing device of FIG. 2, according to an embodiment of the invention.

FIG. 4 shows a method 400 performed by an embedded processor of the computing device 200, such as the embedded processor 308 or the embedded processor 220, according to an embodiment of the invention. The method 400 starts at a dispatcher (402), which runs the method 400 periodically, and/or in response to an event. If external power has not yet been re-supplied (404), then the method 400 ends by going back to the dispatcher. Otherwise, if the residual internal power source capacity is full (406), then the method 400 deasserts a CHARGE_START signal (408), and again goes back to the dispatcher. This means that charging of the internal power source is no longer performed, since it is no longer needed.

If the residual internal power source capacity is not full (406), then the method 400 sends a CHARGE_START signal (410), to start charging of the internal power source. If the residual internal power source capacity is not greater than $C_t$, as previously described (412), then the method 400 goes back to the dispatcher. However, if the residual internal power source capacity is greater than $C_t$, then the POWER_ON signal is sent (414). Sending this signal means that the I/O, or hardware, of the computing device 200 is powered on. Thus, the method 400 is the process performed by the embedded processor to determine when the hardware, or I/O, of the computing device 200 can be powered on, by checking if external power has been re-supplied, charging the battery or other internal power source, and then turning on the hardware, or I/O, once the capacity of the battery or other internal power source is greater than $C_t$.

It is noted that, although specific embodiments have been illustrated and described herein, it will be appreciated by those of ordinary skill in the art that any arrangement calculated to achieve the same purpose may be substituted for the specific embodiments shown. For instance, whereas embodiments of the invention have been substantially described in relation to an ACPI S3 signal as the critical context-saving sleep state-inducing signal, in other embodiments other types of signals may be employed as the critical context-saving sleep state-inducing signal. Furthermore, whereas embodiments of the invention have been substantially described in relation to grid computing, other embodiments are applicable to other types of distributed computing, as well as non-grid computing and non-distributed computing environments. This application is intended to cover any adaptations or variations of embodiments of the present invention. It is manifestly intended that this invention be limited only by the claims and equivalents thereof.

What is claimed is:

1. A method comprising:
   upon receiving a signal indicating that a power source has discharged below a predetermined threshold level,
      setting a flag within non-volatile memory of a computing system, the flag corresponding to receipt of the signal;
   upon receiving indication that external power has been reapplied to the computing system,
      in response to determining that the flag within the non-volatile memory has previously been set,
      resetting the flag within the non-volatile memory; and,
      causing the computing system to enter an unattended operation mode,
   wherein in the unattended operation mode,
      firmware of the computing system unlocking one or more passwords needed to resume previously executing tasks;
      resuming execution the previously executing tasks; and,
      maintaining a display of the computing system in a substantially blank state to ensure security until a user of the computing system arrives.

2. The method of claim 1, further comprising initially setting an option within a basic input/output system (BIOS) of the computing system to set the flag within the non-volatile memory upon receipt of the signal.

3. The method of claim 1, further comprising, upon receiving the indication that the external power has been reapplied to the computing system, and in response to determining that the flag within the non-volatile memory has previously been set, waiting until an internal power source of the computing system has been sufficiently charged by the external power.

4. The method of claim 1, wherein receiving the signal and causing the computing system to enter the unattended operation mode are performed by a basic input/output system (BIOS) of the computing system.

5. The method of claim 1, wherein setting the flag within the non-volatile memory, receiving the indication that the external power has been reapplied to the computing system, and resetting the flag within the non-volatile memory are performed by an embedded processor of the computing system.

6. The method of claim 1, wherein receiving the signal comprises receiving the signal such that the external power has been removed from the computing system.

7. The method of claim 1, wherein receiving the signal comprises receiving a critical Advanced Configuration and Power Interface (ACPI) S4 signal, wherein the critical ACPI S4 signal differs from other ACPI S4 signals in that the critical ACPI S4 signal is generated as a result of the power source having discharged below a predetermined threshold level, whereas the other ACPI S4 signals are generated as a result of user initiation at the computing system.

8. The method of claim 1, wherein receiving the signal comprises receiving a hibernation-inducing signal.

9. The method of claim 1, wherein receiving the indication that the external power has been reapplied to the computing system comprises receiving a power-on reset signal.

10. The method of claim 1, further comprising upon arrival of the user of the computing system, requesting that the user enter the passwords for the user to be able to initiate attended operation activities.

11. The method of claim 1, further comprising, upon receiving the signal,
    saving a current state of the computing system to non-volatile storage; and,
    causing the computing system to enter a context-saving sleep state.

12. The method of claim 11, wherein causing the computing system to enter the context-saving sleep state comprises causing the computing system to enter an Advanced Configuration and Power Interface (ACPI) G3 state.

13. The method of claim 1, farther comprising, upon receiving the indication that the external power has been reapplied to the computing system, and in response to determining that the flag within the non-volatile memory has been set, powering on and resetting the computing system.

14. The method of claim 1, wherein the passwords comprise a hard disk drive password (HDP) of the computing system with a power-on password (POP).

15. A computing system comprising:
    a basic input/output system (BIOS) to receive a signal indicating that external power has been removed from the computing system and to cause the computing system to enter an unattended operation mode, the BIOS having an option to have a flag within non-volatile memory set upon receipt of the signal; and,
    an embedded processor to set the flag within the non-volatile memory in response to the BIOS receiving the signal, to receive indication that the external power has been reapplied to the computing system, and to reset the flag within the non-volatile memory in response to receiving indication that the external power has been reapplied,
    wherein the firmware unlocks one or more passwords needed to resume execution of previously executing tasks upon the computing system entering the unattended operation mode and maintains a display of the computing system in a substantially blank state to ensure security after the previously executing tasks resume execution and until a user of the computing system arrives.

16. The computing system of claim 15, further comprising an internal power source, wherein the embedded processor is further to wait until the internal power source has been sufficiently charged by the external power prior to the BIOS causing the computing system to enter the unintended operation mode, upon the embedded processor receiving the indication that the external power has been reapplied to the computing system.

17. The computing system of claim 15, wherein the signal is a critical Advanced Configuration and Power Interface (ACPI) S4 signal, the critical ACPI S4 signal differing from other ACPI S4 signals in that the critical ACPI S4 signal is generated as a result of the power source having discharged below a predetermined threshold level, whereas the other ACPI S4 signals are generated as a result of user initiation at the computing system.

18. An article of manufacture comprising:
a computer-readable medium; and,
means in the medium for setting a flag within non-volatile memory of a computing system in response to receiving a signal indicating that external power has been removed from the computing system, and for resetting the flag within the non-volatile memory and causing the computing system to enter an unattended operation mode in response to receiving indication that the external power has been reapplied to the computing system, wherein the means is further for unlocking one or more passwords needed to resume execution of previously executing tasks upon the computing system entering the unattended operation mode and for maintaining a display of the computing system in a substantially blank state to ensure security after the previously executing tasks resume execution and until a user of the computing system arrives.

19. The article of claim 18, wherein the means is further for waiting until an internal power source of the computing system has been sufficiently charged by the external power, upon receiving the indication that the external power has been reapplied to the computing system, and before causing the computing system to enter the unattended operation mode.

20. The article of claim 18, wherein the signal is a critical Advanced Configuration and Power Interface (ACPI) S4 signal, the critical ACPI S4 signal differing from other ACPI S4 signals in that the critical ACPI S4 signal is generated as a result of the power source having discharged below a predetermined threshold level, whereas the other ACPI S4 signals are generated as a result of user initiation at the computing system.

* * * * *